United States Patent [19]

Yanagisawa

[11] Patent Number: 4,849,305
[45] Date of Patent: Jul. 18, 1989

[54] MAGNETIC RECORDING MEDIUM
[75] Inventor: Masahiro Yanagisawa, Tokyo, Japan
[73] Assignee: NEC Corporation, Japan
[21] Appl. No.: 912,358
[22] Filed: Sep. 26, 1986
[30] Foreign Application Priority Data
  Sep. 26, 1985 [JP] Japan .................. 60-213957
[51] Int. Cl.⁴ .............................................. G11B 5/64
[52] U.S. Cl. .................... 428/695; 427/131; 428/694; 428/900
[58] Field of Search ............... 428/694, 695, 900; 427/131

[56] References Cited

U.S. PATENT DOCUMENTS

| 4,152,487 | 5/1979 | Yanagisawa | 428/900 |
| 4,307,156 | 12/1981 | Yanagisawa | 428/64 |
| 4,390,562 | 6/1983 | Yanagisawa | 428/900 |
| 4,529,659 | 7/1985 | Hoshino | 428/422 |
| 4,583,145 | 4/1986 | Mönnich | 428/422 |
| 4,696,845 | 9/1987 | Yanagisawa | 428/900 |

FOREIGN PATENT DOCUMENTS

| 057628 | 4/1983 | Japan | 428/329 |
| 080522 | 4/1986 | Japan | 422/131 |
| 120340 | 6/1986 | Japan . | |
| 178724 | 8/1986 | Japan | 427/131 |
| 87/01501 | 3/1987 | PCT Int'l Appl. | 428/695 |

Primary Examiner—Paul J. Thibodeau
Attorney, Agent, or Firm—Laff, Whitesel, Conte & Saret

[57] ABSTRACT

Herein disclosed is an improved magnetic recording medium which comprises a substrate, a magnetic recording layer, if necessary, a protective layer, an adhesion promoting layer and a lubricant layer, respectively applied or deposited on the substrate in the recited order.

The magnetic recording medium is characterized in that the difference $T_a - T_1$ between the specific surface tension $T_a$ of the adhesion promoting layer and the specific surface tension $T_1$ of the lubricant layer is adjusted to $-5$ to 30 dyne/cm.

The magnetic recording layer according to the present invention is improved in that the lubricant layer is adhered strongly to the adhesion promoting layer so that the lubricant is hardly dissipated at the time of rotation of the magnetic recording medium. Thus the loss in the volume of the lubricant layer decreases. As a result, the properties of the magnetic recording medium such as durability and abrasion resistance are improved.

30 Claims, 1 Drawing Sheet

MAGNETIC RECORDING MEDIUM

BACKGROUND OF THE INVENTION

1. Field of the Invention

The present invention relates to a magnetic recording medium, more particularily to a magnetic recording medium such as a magnetic disc memory or a magnetic drum memory used for recording in and reproducing information.

2. Description of the Related Art

Generally, there have been proposed some methods for recording and reproduction using a magnetic memory system composed of a magnetic head for recording and reproducing and a magnetic recording medium. For example, one of the methods is contact-start-stop (CSS) type, in which, at the start of recording or reproducing operation, the head is set to be contact with the surface of the magnetic recording medium. Then, the magnetic recording medium is rotated at a predetermined speed to form an air space between the head and surface of the magnetic recording medium. In this state, information is recorded in or reproduced from the magnetic recording medium. In this method, however, at the end of the recording or reproducing operation, the rotation of the magnetic recording medium is stopped so that the head comes to be contact with the surface of the magnetic recording medium with a friction. In this case, the head and the magnetic recording medium are abraded with each other due to the friction force generated therebetween to result in scratches on the surface of the head or that of the magnetic recording medium. In particular, when the rotation of the magnetic recording medium is stopped, such damage is caused.

In the contact state, a slight change of the position of the head makes the load unbalanced between the head and the recording medium to thereby cause scratches on the surface of the head or the magnetic recording medium.

In Japanese Patent Laid-open No. 49805/1977, it is disclosed that a liquid lubricant such as perfluoroalkylpolyether or silicone oil is coated on the surface of the magnetic recording medium in order to prevent the magnetic recording medium from being damaged due to the contact with the head. However, such a coating of the liquid lubricant is not sufficient for preventing the damage. Because the liquid lubricant is dissipated and removed from the recording medium by the centrifugal force due to the rotatory motion of the medium. Thus, the abrasion resistance of the magnetic recording medium is deteriorated after long time use thereof.

SUMMARY OF THE INVENTION

A principal object of the present invention is to provide a magnetic recording medium having an improved abrasion resistance.

Another object of the present invention is to provide a magnetic recording medium coated with a lubricant which is not dissipated during the operation.

A further object of the present invention is to provide a magnetic recording medium in the form of a floppy disk, a magnetic tape or a magnetic card, in which the lubricant is coated with a sufficient adhesion force.

According to the present invention, there is provided a magnetic recording medium comprising a substrate, a magnetic recording layer on the surface of said substrate, an adhesion promoting layer on said magnetic recording layer and a lubricant layer on said adhesion promoting layer.

The magnetic recording medium according to the present invention is characterized in that the difference $(T_a - T_1)$ between the specific surface tension $T_a$ of the adhesion promoting layer and the specific surface tension $T_1$ of the lubricant layer is adjusted to $-5$ to $+$dyne/cm. in other words, in case the specific surface tension $T_a$ of the adhesion promoting layer is larger than the specific surface tension $T_1$ of the lubricant layer, the the difference $(T_a - T_1)$ is smaller than 30 dyne/cm. On the other hand, in case the specific surface tension $T_a$ of the adhesion promoting layer is smaller than the specific surface tension $T_1$ of the lubricant layer, the the difference $(T_1 - T_a)$ is than 5 dyne/cm.

According to an embodiment of the present invention, the magnetic recording medium further comprises a protective layer between the magnetic recording layer and the adhesion promoting layer.

The magnetic recording layer contains one member selected from the group consisting of ceramics of iron oxides or iron nitrides and a metal such as cobalt, iron and manganese.

The lubricant layer of the present invention contains at least one member selected from the group consisting of perfluoroalkylpolyether, polytetrafluoroethylene, polytetrafluoroethylene tetramer, higher fatty acid, higher aliphatic alcohol, higher fatty ester, higher fatty amide, aliphatic amine, unsaturated higher fatty acid, long chain aliphatic hydrocarbon, iso-paraffin hydrocarbon oil, aromatic hydrocarbon, polyalkyleneglycol, dibasic acid ester, polyolester, phosphate ester, polysiloxane, silicate ester, silane, polyoxiethylene, neopentylpolyol, polyphenylether, chlorofluorocarbon, fluoroester and 2, 4, 6-tripentafluoroheptyltriazine.

The adhesion promoting layer of the present invention contains at least one compound containing at least one functional group selected from the group consisting of carboxyl; isocyanate; $-M(OR)_3-nRn$, n being 0, 1 or 2 and M being Si, Ti, Zr, Ge or Sn; cyano; amino; $-NRH$, R being $-C_mH_{2m+1}$, and m being integer more than 1; imino; ethyl; sulfonic; nitroso; hydroxyl, carboxylic ester; ureylene; amide; isothiocyanate; mercaptan; carbamoyl; phosphono; phosphinic; phosphoroso; phosphinetriyl; ether; sulfide; dimethyl peroxide; vinylene; and ethynylen group.

BRIEF DESCRIPTION OF THE DRAWING

The present invention will be more fully explained with reference to the accompanying drawings in which.

DESCRIPTION OF THE PREFERRED EMBODIMENTS

As mentioned above, the magnetic recording medium of the prior art presents a lot of problems to be solved. It is necessary to improve some properties, in particular, such as durability, abrasion resistance and adhesive force between the magnetic recording medium and the lubricant.

According to the present invention, the aforementioned drawbacks of the prior arts may effectively be solved due to an adhesion promoting layer having a specific surface tension which is near the value of that of the lubricant layer.

Figure 1:
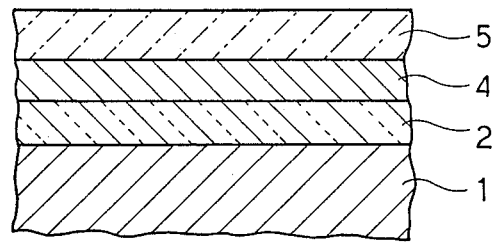
FIGS. 1 and 2 are respectively partially sectional views of two different embodiments of the magnetic recording medium according to the present invention.

A magnetic recording medium according to a preferred embodiment of this invention, as shown in FIG. 1, comprises a substrate 1, a magnetic recording layer 2, an adhesion promoting layer 4 and a lubricant layer 5, which are deposited or applied on the substrate 1 in the recited order. The difference ($T_a-T_1$) between the specific surface tension $T_a$ of the adhesion promoting layer 4 and the specific surface tension $T_1$ of the lubricant layer 5 is adjusted to a range of $-5$ to 30 dyne/cm.

As the material for the substrate 1, there may be used, for instance, a metal such as aluminium alloy, titanium alloy or stainless steel; a plastic such as polyester, polyimide, polyamideimide, polyethersulfone, polysulfone, aromatic polyether, epoxy resin, urea resin, melamine resin, polycarbonate, diallylphthalate resin, acrylic resin, phenolic resin, polyphenylenesulfide, polyphenyleneether, polyacetal resin, polybutyleneterephthalate, bismaleimidetriazine resin, polyoxibenzylene resin, polyaminobismaleimide resin, polyphenyleneoxide or polyphenylenesulfide; a ceramics such as glass, silicon, germanium, alumina, silica or diamond; an aluminium alloy coated with anodized alumite; a plated alloy composed of an aluminium alloy, titanium alloy and stainless steel plated with a metal such as Ni-P, Cr, FeNi, stainles steel, Mo or W, the above mentioned plastic or the ceramics; a composite material of said plastic coated with said metal or said ceramics, or ceramics coated with said metal or said plastics.

As the material for the magnetic recording layer 2 deposited on said substrate 1, there may be used, for instance, a ceramics containing iron oxide such as $Fe_3O_4$, $\gamma$-$Fe_2O_3$ or barium ferrite, and iron nitride such as $Fe_3N_4$; a cobalt-containing alloy such as Co, Co-Ni-P, Co-Mn-P, Co-Mn-Ni-P, Co-Re, Co-Ni-Re, Co-Mn-Re-P, Co-Cr, Co-Fe-Cr, Co-V, Co-Ru, Co-Os, Co-Pt, Co-Ni-Pt, Co-Pt-Cr, Co-Pt-Cr, Co-Pt-V, Co-Rh, Co-Cr-Rh, Co-Ni-Mo, Co-Ni-Cr, Co-Ni-W or Co-Sm, an iron-containing metal such as Fe-Mg, Fe-Nd, Fe-Ag, Fe-Pd or Fe-Tb and a manganese-containing metal such as Mn-Al or Mn-Cu-Al.

Figure 2:
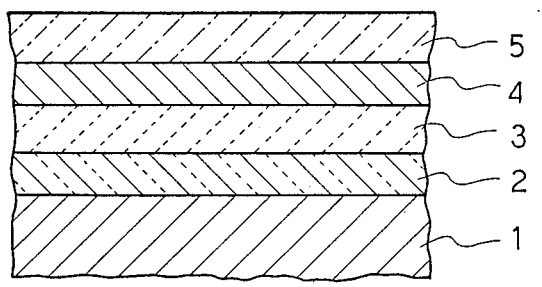

The adhesion promoting layer 4 may be deposited directly on the magnetic recording layer 2, or, as shown in FIG. 2, it may be deposited thereon through a protecting layer 3. The material for the adhesion promoting layer 4 should be selected depending on the properties of for the magnetic recording layer 2 and lubricant layer 5.

The material used preferbly for the adhesion promoting layer 4 includes compounds containing at least one functional group such as —COOH, —NCO, —M(OR)$_3$—nRn (n is 0, 1 or 2 and M is a metal or semi-metal such as Si, Ti, Zr, Ge or Sn), —CN, —NH$_2$, —NRH, —NH—, —CH—CH$_2$, —SO$_3$H, —NO, —OH, —COOR, —NHCONH—, —NHCO—, —NCS, —SH, —CONH$_2$, —PO(OH)$_2$, =PO(OH), =PO—, =P—, —O—, —S, —CH$_2$—O—O—CH$_2$—, —CH=CH— or —C≡C—(R is —C$_m$H$_{2m+1}$, m being integer equal to or larger than 1).

In case the magnetic recording layer 2 is composed of a metal selected from the above mentioned metals, the compound containing —COOH, —CH—CH$_2$, —NH$_2$ or —CN group among said functional groups is most suitably used as the material for the adhesion promoting layer 4.

In the case of using ceramics as a material for the magnetic recording layer 2, the compound containing —Si(OR)$_3$—nRn group is the most suitable one for the material for the adhesion promoting layer 4.

It is necessary that the adhesion promoting layer 4 contains a specific segment molecule, of which the surface tension is equal to or differs by $-5$ to 30 dyne/cm from that of the lubricant layer 5. The segment molecule used in the adhesion promoting layer 4 is determined from the structure of the lubricant molecule. Therefore, it is advantageous for the object of the present invention that the segment molecule in the adhesion promoting layer has the same structure as that of the lubricant molecule, or that the difference between the specific surface tension of the adhesion promoting layer 4 and that of the lubricant layer 5 is adjusted to the above mentioned range. For example, in the case of using perfluoro compound containing perfluoroalkyl group ($R_f$—, $R_f$ is —$C_kF_{2k+1}$, k being integer equal to or larger than 1) as the lubricant, it is preferable that the segment molecule in the adhesion promoting layer 4 contains perfluoroalkyl group.

In the case of using perfluoroalkylether compound containing perfluoroalkylether group ($R_f$—O—$R_f$) as the lubricant, it is preferable that the segment molecule in the adhesion promoting layer 4 contains said perfluoroalkylether. Further, in the case of using silicone compound containing silicone (—SiRR', —O—SiRR'—) as the lubricant, it is preferable that the segment molecule in the adhesion promoting layer 4 contains the same silicone. In the case of using alkyl or alkylene compound containing alkyl group (—R, —R', R and R' are —$C_iH_{2i+}$, i being integer equal to or larger than 1) or alkylene group (—R", R" is —$C_iH_{2i}$, i being integer equal to or larger than 1) as the lubricant respectively, it is preferable that the segment molecule in the adhesion promoting layer contains the same alkyl group or the same alkylene group.

In order to adjust the difference between the surface tension of the lubricant molecule and that of the segment molecule within the above mentioned range, other molecules may be introduced into the lubricant molecule or segment molecule. For example, in case the segment molecule contains alkyl compound, alkyl group may be introduced into the lubricant molecule containing perfluoroalkylether group. In case the segment molecule contains perfluoroalkyl group, perfluoroalkyl group may be introduced into the lubricant molecule containing silicone.

As the material for the lubricant layer 5, there may be used, for instance, perfluoroalkylpolyether such as perfluoropropylether and perfluoroethylether; polytetrafluoroethylene; polytetrafluoroethylenetetramer; higher fatty acid; higher aliphatic alcohol; higher fatty ester; higher fatty amide; aliphatic amine; unsaturated higher fatty acid; long-chain aliphatic hydrocarbon; isoparaffinehydrocarbon oil such as $\alpha$-olefin oligomer and polybutene; aromatic hydrocarbon such as alkylbenzene; polyalkyleneglycol (for example, polypropyleneglycol, polyethyleneglycol, etc.) such as polyglycol (polyether) and polyalkyleneoxide; dibasic acid ester such as di-2-ethylhexylsebacate, di-2-ethylhexyladipate, di-iso-decyladipate, di-2-ethylhexylazerate and di-iso-octyladipate; polyolester such as trimethylolpropanester, neopentylglycolester, pentaerythritolester, dipentaerythritolester, trimethylolethaneester, di(isooctyl) azerate, bis(2, 2-dimethyloctyl) azerate or bis (2, 2-dimethylpentyl) 2, 2, 8, 8-tetraethylazerate; phosphate ester such as tricresylphosphate, triphenylphosphate, tributylphosphate and tri-2-ethylhexylphosphate; polysiloxane such as dimethylpolysiloxane, methylphenylpolysiloxane, trifluoropropylmethylsilicone (fluorosilicone) and chlorophenylsilicone; silicate ester such as hexa (2-ethylbutoxy) disoloxane; silane such as methyldioctylnonylsilane; polyoxyethylene; neopentylpolyol; polyphenylether such as m-bis(m-phenoxyphenoxy)benzene, p-bis(p-phenoxyphenoxy)benzene, o-bis(o-phenoxyphenoxy)benzene, bis(m-phenoxyphenyl) ether, bis(p-phenoxyphenyl) ether, bis(o-phenoxyphenyl) ether and C-ether; chlorofluorocarbon such as polychlorotrifluoroethylene; fluoroester such as comphoric $C_7$ fluoroalkylester and pyromellitic $C_7$ fluoroalkylester and 2, 4, 6-tripentafluoroheptyltriazine.

Now, referring to FIG. 2, another preferred embodiment of the magnetic recording medium according to the present invention will be explained. Similar to the embodiment shown in FIG. 1, the recording medium according to the present embodiment comprises a substrate 1, a magnetic recording layer 2, a protective layer 3, an adhesion promoting layer 4 and a lubricant laer 5, respectively deposited or applied in the recited order. As a material for the protective layer 3, there may be used, for instance, silicone compound such as $SiO_2$, $Si_3N_4$, SiC or silicic polymeric product; metal oxide such as $Al_2O_3$, CoO, $Co_3O_4$, $Co_2O_3$, $\alpha$-$Fe_2O_3$, $Cr_2O_3$, $CrO_3$, $TiO_2$, $ZrO_2$, ZnO, PbO, NiO, $MoO_2$ or $SnO_2$; metal nitride such as TiN, ZrN, CrN, TaN or BN; metal sulfide such as $MoS_2$, $WS_2$ or $TaS_2$; metal carbide such as TiC, ZrC, CrC or TaC; metal fluoride such as graphite fluoride; metal such as W, Cr, Ir, NiB, NiP, FeCr, NiCr, Sn, Pb, Zn, Tl, Au, Ag, Cu, Ga, Ru, Rh, Mn, Mo, Os, Ta or alloys thereof; semiconductor such as Si, Ge, B or C (for example, amorphous carbon, diamondlike carbon or the mixture thereof) or plastic such as polytetrafluoroethylene, phenolic resin or polyimide.

The material for the adhesion promoting layer 4 is preferably selected depending upon the properties of the protective layer 3. For example, in case the protective layer 3 contains a metal selected from the above-mentioned group, the adhesion promoting layer 4 is preferably composed of a compound containing at least one functional grop selected from the group consisting of —COOH, —CH—$CH_2$, —$NH_2$ and —CN. In case the protective layer 3 contains a silicone compound or a ceramics containing metal oxide, metal nitride, metal sulfide, metal carbide or semiconductor, the adhesion promoting layer 4 is preferbly used composed of a compound containing —Si(OR)$_3$—nRn group. Moreover, in case the protective layer 3 contains the plastics, the adhesion promoting layer 4 is preferably composed of a compound containing at least one functional group selected from the group consisting of —CH—$CH_2$, —$NH_2$, —CN, —CH=CH—, —C≡C— and —$CH_2$—O—O—$CH_2$—.

In the magnetic recording medium of the structure described above, the functional group in the segment molecule of the adhesion promoting layer 4 is reacted with the surface of the magnetic recording layer 2 or to that of the protective layer 3 to thereby be bonded strongly therewith. Moreover, by adjusting the difference ($T_a - T_1$) between the specific surface tension $T_a$ of the adhesion promoting layer 4 and that $T_1$ of the lubricant layer 5 in the range of $-5$ to 30 dyne/cm, the adhesion promoting layer 4 is effectively bonded to the lubricant layer 5 without lowering the flowability of the lubricant layer 5. Therefore, the lubricant layer 5 is hardly removed from the magnetic recording medium even when the magnetic recording medium is rotated at a high speed. This is based on the fact that the surface tension is proportional to the intermolecular cohesive energy. When the cohesive energy at the interface between the adhesion promoting layer 4 and the lubricant layer 5 is the same value as the cohesive energy in the lubricant layer, the dissipated amount of the lubricant volume by the centrifugal force at the rotary motion of the medium becomes minimum.

On the contrary, when the cohesion energy at the interface between the adhesion promoting layer 4 and the lubricant layer 5 is extremely different from the cohesive energy in the lubricant layer 5, the lubricant flows on the adhesion promoting layer 4, with a result that the lubricant volume dissipated by the centrifugal force increases.

The adhesion property of the lubricant was evaluated by rotating the magnetic recording medium continuously during 30 days at a speed of 10,000 rpm. From the result of this test, we found that, in order to make the dissipated amount of the lubricant to less than 50%, it is desirable to adjust the difference between the specific surface tension of the adhesion promoting layer 4 and that of the lubricant layer 5. For this sake, in case the specific surface tension of the adhesive promoting layer 4 is higher than that of the lubricant layer 5, the difference lower than 30 dyne/cm is allowable. On the contrary, in case the specific surface tension of the adhesion promoting layer 4 is lower than that of the lubricant layer 5, the difference lower than 5 dyne/cm is allowable. This is because the lubricant tends to be dissipated from the surface of the adhesion promoting layer 4 in case the specific surface tension of the adhesion promoting layer 4 is lower than that of the lubricant layer 5.

Thus, the magnetic recording medium according to the present invention is characterized in that the medium contains the adhesion promoting layer having a specific surface tension within the specific range on the basis of that of the lubricant layer.

In the following examples, applications of the magnetic disc are disclosed. However, the magnetic recording medium according to the present invention can be utilized effectively in the form of a floppy disc, a magnetic tape and a magnetic card etc.

The invention will be explained in more concretly in the light of the following nonlimitative examples and comparative examples.

EXAMPLE 1

A disc of an aluminium alloy coated with Ni-P was planished to a surface roughness of 0.02 microns to provide a substrate 1. On the surface of the substrate 1, Co-N-P alloy was plated with a thickness of 0.05 microns to form a magnetic recording layer 2. Then, polysilicic acid (silicate polymeric product) as disclosed in the Japanese Patent Laid-Open No. 20804/1977 was applied on the magnetic recording layer 2 in a thickness of 500 Å by the spin coating method to form a protective layer 3, and burned at 250° C. Then, as the adhesion promotion layer 4, perfluoroalkylpolyethersilane represented by the following formula was applied on the protective layer 3 in a thickness of 20 Å. Thereafter, as the lubricant layer 5, perfluoroalkylpolyether represented by the following formula was applied on the adhesion promoting layer 4 in a thickness of 50 Å to thereby provide a magnetic recording disc according to the present invention.

perfluoroalkylpolyethersilane;
F[CF(CF$_3$)CF$_2$O]$_n$C$_2$F$_4$COONHC$_2$H$_4$Si(OCH$_3$)$_3$ perfluoroalkylpolyether;
F[CF(CF$_3$)CF$_2$O]$_m$C$_2$F$_5$ (n is 10 to 20 and m is 30 to 40)

The surface tension of the adhesion promoting layer was 20.0 dyne/cm, while that of the lubricant layer was 19.6 dyne/cm. The magnetic disc was rotated during 30 days at a speed of 10,000 rpm, and then the change of the thickness of the lubricant layer was determined to be 3% decrease.

EXAMPLE 2

The procedures of the example 1 were repeated except that, as the adhesion promoting layer 4, triacontyltriethoxysilane represented by the following formula was applied and that, as the lubricant layer 5, perfluoroalkylpolyether represented by the following formula was applied on the adhesion promoting layer. As a result, a magnetic disc according to the present invention was obtained.

triacontyltriethoxysilane;
C$_{30}$H$_{61}$Si(OC$_2$H$_5$)$_3$ perfluoroalkylpolyether;
F(C$_2$F$_4$O)$_p$(CF$_2$O)$_q$CF$_3$ (p is 12 and q is 8)

The surface tension of the adhesion promoting layer was 24.0 dyne/cm, while that of the lubricant layer was 25.0 dyne/cm.

The magnetic disc was rotated during 30 days at a speed of 10,000 rpm, and then the change of the thickness of the lubricant layer was determined to be 5% decrease.

EXAMPLE 3

The procedures of the example 1 were repeated except that, as the protective layer 3, Ni-P alloy was plated on the magnetic recording layer 2 in a thickness of 100 Å by the electrolessly plating method, that, as the adhesion promoting layer 4, perfluoroalkylpolyetheramine represented by following formula was applied on the protective layer 3 and that, as the lubricant layer 5, fluorosilicone oil represented by following formula was applied on the adhesion promoting layer 4. As a result, a magnetic disc according to the present invention was obtained.

perfluoroalkylpolyether amine;
F[CF(CF$_3$)CF$_2$]$_n$CF$_2$NH$_2$
fluorosilicone oil;
(H$_3$C)$_3$SiO[Si(C$_2$H$_4$C$_6$F$_{13}$)(CH$_3$)O]$_m$CH$_3$ (n is 16 and m is 20)

The surface tension of the adhesion promoting layer was 19.0 dyne/cm, while that of the lubricant layer was 21.0 dyne/cm. The magnetic disc was rotated during 30 days at a speed of 10,000 rpm, and then the change of the thickness of the lubricant layer was determined to be 7% decrease.

EXAMPLE 4

The procedures of the example 3 were repeated except that, as the adhesion promoting layer 4, perfluoroalkylpolyetherdicarboxylic acid represented by following formula was applied on the protective layer 3, and that, as the lubricant layer 5, polyethyleneglycol represented by following formula was applied on the adhesion promoting layer 4. As a result, a magnetic disc according to the present invention was obtained.

perfluoroalkylpolyetheramine;
HOOCCF$_2$(C$_2$F$_4$O)$_r$(CF$_2$O)$_s$CF$_2$COOH polyethyleneglycol;
H$_{21}$C$_{10}$O(C$_2$H$_4$O)$_n$H (r is 10 and n is 8)

The surface tension of the adhesion promoting layer was 18.0 dyne/cm, while that of the lubricant layer was 23 dyne/cm.

The magnetic disc was rotated during 30 days at a speed of 10,000 rpm, and then the change of the thickness of the lubricant layer was determined to be 22% decrease.

EXAMPLE 5

A magnetic disc was prepared in the same manner as in the example 1, except that, as the protective layer 3, carbon was deposited on the magnetic recording layer 2 in a thickness of 200 Å by sputtering, also as the adhesion promoting layer 4, perfluoroalkylpolyetheriscyanate represented by following formula was applied on the protective layer 3 and that, as the lubricant layer 5, perfluoroalkylpolyether represented by following formula was applied on the adhesion promoting layer 4.

perfluoroalkylpolyetherisocyanate;
OCNC$_6$H$_3$(CH$_3$)HNCOCF$_2$(C$_2$F$_4$O)$_r$ (CF$_2$O)$_s$CF$_2$CONH(CH$_3$)C$_6$H$_3$NCO perfluoroalkylpolyether;
F(C$_2$F$_4$O)$_p$(CF$_2$O)$_q$CF$_3$ (r is 12, s is 8, p is 16 and q is 14)

The surface tension of the adhesion promoting layer was 20.0 dyne/cm, while that of the lubricant layer was 18.0 dyne/cm. The magnetic disc was rotated during 30 days at a speed of 10,000 rpm, and then the change of the thickness of the lubricant layer was determined to be 20% decrease.

EXAMPLE 6

A magnetic disc was prepared in the same manner as in the example 3, except that, as the adhesion promoting layer 4, 4-hydroxybutyric acid represented by following formula was applied on the protective layer 3 and that, as the lubricant layer 5, dimethylpolysiloxane represented by following formula was applied on the adhesion promoting layer 4.

4-hydroxybutyric acid;
HO(CH$_3$)COOH dimethylpolysiloxane;
(H$_3$C)$_3$SiO[Si(CH$_3$)$_2$O]$_n$Si(CH$_3$)$_3$ (n is 180)

The surface tension of the adhesion promoting layer was 45.0 dyne/cm, while that of the lubricant layer was 20.0 dyne/cm. The magnetic disc was rotated during 30 days at a speed of 10,000 rpm, and then the change of the thickness of the lubricant layer was determined to be 25% decrease.

EXAMPLE 7

A magnetic disc was prepared in the same manner as in the example 1, except that, as the adhesion promoting layer 4, polyethyleneoxidetrimethoxysilane represented by following formula was applied on the protective layer 3 and that, as the lubricant layer 5, polyethyleneoxide represented by following formula was applied on the adhesion promoting layer 4.

polyethyleneoxidetrimethoxysilane;
$H_3C(C_2H_4O)_nSi(OCH_3)_3$ polyethyleneoxide;
$H_3C(C_2H_4O)_mH$ (n is 3 and m is 10)

The surface tension of the adhesion promoting layer was 35.0 dyne/cm, while that of the lubricant layer was 34.5 dyne/cm.

The magnetic disc was rotated during 30 days at a speed of 10,000 rpm, and then the change of the thickness of the lubricant layer was determined to be 10% decrease.

EXAMPLE 8

A magnetic disc was prepared in the same manner as in the example 1, except that, Cr was deposited on NiP plated layer of the substrate 1 in the thickness of 1 micron by sputtering, that, as the magnetic recording layer 2, CoNi alloy was deposited on the substrate 1 in a thickness of 0.05 microns by sputtering, that, as the protective layer 3, Cr was deposited on the magnetic recording layer 2 in a thickness of 200 Å by sputtering, that, as the adhesion promoting layer 4, ethyleneglycol represented by following formula was applied on the protective layer 3 and that, as the lubricant layer 5, perfluoroalkylpolyether represented by following formula was applied on the adhesion promoting layer.

ethylene glycol;
$HOCH_2CH_2OH$ perfluoroalkylpolyether;
$F(C_2F_4O)_p(CF_2O)_qCF_3$ The surface tension of the adhesion promoting layer was 50.2 dyne/cm, while that of the lubricant layer was 24.0 dyne/cm.

The magnetic disc was rotated during 30 days at a speed of 10,000 rpm, and then the change of the thickness of the lubricant layer was determined to be 23% decrease.

EXAMPLE 9

A magnetic disc was prepared according to the method disclosed in the example 1, except that, as the protective layer 3, NiP was plated in a thickness of 500 Å on the magnetic recording layer 2 and then burned at 300° C. for 2 hours to thereby oxidize the surface of the NiP layer in the thickness of 500 Å to form NiO layer, that, as the adhesion promoting layer 4, fluoroalkylthioethersilane represented by following formula was applied to the NiO layer, and that, as the lubricant layer 5, perfluoroalkane represented by following formula was applied to the adhesion promoting layer 4.

perfluoroalkylthioether;
$C_9F_{19}C_2H_4SSi(OCH_3)_3$ polyfluoroalkane;
$C_{18}F_{38}$ The surface tension fo the adhesion promoting layer was 14.0 dyne/cm, while that of the lubricant layer was 13.0 dyne/cm. The magnetic disc was rotated during 30 days at a speed of 10,000 rpm, and then the change of the thickness of the lublicant layer was determined to be 10% decrease.

EXAMPLE 10

A magnetic disc was prepared in the similar manner as in the example 1, except that, as the magnetic recording layer 2, $\gamma$-$Fe_2O_3$ was deposited on the substrate 1 in the thickness of 0.1 micron by sputtering, that, as the adhesion promoting layer 4, perfluoroalkylpolyethersilane represented by following formula was applied on the magnetic recording layer 2 and that, as the lubricant layer 5, perfluoroalkylpolyether represented by following formula was applied on the adhesion promoting layer 4.

perfluoroalkylpolyethersilane;
$(H_3CO)_3SiC_3H_6NHOCCF_2(C_2F_4O)_p(CF_2O)_qCF_2CONHC_3H_6Si(OCH_3)_3$ perfluoroalkylpolyether;
$F(C_2F_4O)_r(CF_2O)_sCF_3$ (p is 6, q is 4, r is 16 and s is 14)

The surface tension of the adhesion promoting layer was 20.0 dyne/cm, while that of the lubricant layer was 18.0 dyne/cm. The magnetic disc was rotated during 30 days at a speed of 10,000 rpm, and then the change of the thickness of the lubricant layer was determined to be 15% decrease.

EXAMPLE 11

A magnetic disc was prepared in the similar manner as in the example 1, except that, as the magnetic recording layer 2, CoCr alloy was deposited on the substrate 1 in the thickness of 0.1 micron by sputtering, that, as the adhesion promoting layer 4, perfluoroalkylpolyetherdicarboxylic acid represented by following formula was applied on the magnetic recording layer 2 and that, as the lubricant layer 5, perfluoroalkylpolyether represented by following formula was applied on the adhesion promoting layer 4.

perfluoroalkylpolyetherdicarboxylic acid;
$HOOCCF_2(C_2F_4O)_p(CF_2O)_qCF_2COOH$ perfluoroalkylpolyether;
$F(C_2F_4O)_r(CF_2O)_sCF_3$ (p is 8, q is 6, r is 18 and s is 16)

The surface tension of the adhesion promoting layer was 20.0 dyne/cm, while that of the adhesion promoting layer was 18.0 dyne/cm. The magnetic disc was rotated during 30 days at a speed of 10,000 rpm, and then the change of the thickness of the lubricant layer was determined to be 15% decrease.

EXAMPLE 12

A magnetic disc was prepared in the similar manner as in the example 1, except that, as the protective layer 3, BN was deposited on the magnetic recording layer 2 in the thickness of 0.1 micron by sputtering, that, as the adhesion promoting layer 4, oxyperfluoroalkylpolyethersilane represented by following formula was applied on the protective layer 3 and that, as the lubricant layer 5, perfluoroalkylpolyetherdiol represented by following formula was applied on the adhesion promoting layer 4.

oxyperfluoroalkylpolyethersilane;

HOCH$_2$CF$_2$(C$_2$F$_4$O)$_p$(CF$_2$O)$_q$CF$_2$CH$_2$OCH$_2$CH(OH)C$_3$H$_6$Si(OCH$_3$)$_3$ perfluoroalkylpolyetherdiol;
HOCH$_2$CF$_2$(C$_2$F$_4$O)$_p$(CF$_2$O)$_q$CF$_2$CH$_2$OH (p is 14 and q is 12)

The surface tension of the adhesion promoting layer was 23.0 dyne/cm, while that of the lubricant layer was 21.0 dyne/cm. The magnetic disc was rotated during 30 days at a speed of 10,000 rpm, and then the change of the thickness of the lublicant layer was determined to be 10% decrease.

EXAMPLE 13

A magnetic disc was prepared in the similar manner as in the example 1, except that, as the protective layer 3, TiC was deposited on the magnetic recording layer 2 in the thickness of 0.1 micron by sputtering, that, as the adhesion promoting layer 4, perfluoroalkylpolyetherdiester represented by following formula was applied on the protective layer 3 and that, as the lubricant layer 5, perfluoroalkylpolyetherdiester represented by following formula was applied on the adhesion promoting layer.

perfluoroalkylpolyetherestersilane;
H$_3$COOCCF$_2$(C$_2$F$_4$O)$_p$(CF$_2$O)$_q$CF$_2$COONHC$_2$H$_4$Si(OC$_2$H$_5$)$_3$ perfluoroalkylpolyetherdiester;
H$_3$COOCCF$_2$(C$_2$F$_4$O)$_r$(CF$_2$O)$_s$CF$_2$COOCH$_3$ (p is 6, q is 4, r is 16 and s is 14)

The surface tension of the adhesion promoting layer was 21.0 dyne/cm, while that of the lubricant layer was 19.8 dyne/cm. The magnetic disc was rotated during 30 days at the speed of 10,000 rpm, and then the change of the thickness of the lublicant layer was determined to be 10% decrease.

COMPARATIVE EXAMPLE 1

A magnetic disc was prepared in the similar manner as in the example 1, except that, as the adhesion promoting layer 4, perfluoroalkylsilane represented by following formula was applied and then as the lubricant layer, perfluoroalkylpolyether represented by following formula was applied on the adhesion promoting layer 4. Thus, a magnetic disc was obtained for comparison.

perfluoroalkylsilane;
C$_{10}$F$_{21}$C$_2$H$_4$Si(OC$_2$H$_5$)$_3$ perfluoroalkylpolyether;
F(C$_2$F$_4$O)$_p$(CF$_2$O)$_q$CF$_3$ The surface tension of the adhesion promoting layer was 13 dyne/cm, while that of the lubricant layer was 18.5 dyne/cm. The magentic disc was rotated during 30 days at a speed of 10,000 rpm, and then the change of the thickness of the lublicant layer was determined to be 80% decrease.

COMPARATIVE EXAMPLE 2

A magnetic disc was prepared in the similar manner as in the example 3; except for applying perfluoroalkylpolyether represented by following formula on the protective layer 3 as the lubricant layer 5.

perfluoroalkylpolyether
F(C$_2$F$_4$O)$_p$(CF$_2$O)$_q$CF$_3$

The surface tension of the protective layer 3 was 54.0 dyne/cm, while that of the lubricant layer was 18.0 dyne/cm.

The magnetic disc was rotated during 30 days at a speed of 10,000 rpm, and then the change of the thickness of the lubricant layer was determined to be 70% decrease.

We claim:

1. A magnetic recording medium comprising a substrate, a magnetic recording layer on the surface of said substrate, an adhesion promotion layer on said magnetic recording layer and a lubricant layer on said adhesion promotion layer, the adhesion promotion layer (APL) being at least one member selected from a group consisting of perfluoroalkylpolyethersilane, perfluoroalkylpolyetherisocyanate, polyethyleneoxide trimethoxysilane, fluoroalkylthioethersilane, perfluoroalkylpolyethersilane, perfluoroalkylpolyether, oxyperfluoroalkylpolyethersilane and perfluoroalkylpolyether, and the lubricant layer being at least one member select from a group consisting of perfluoroalkylpolyether, perfluoroalkylpolyether, polyethyleneoxide, perfluoroalkane, perfluoroalkylpolyetherdiol and perfluoroalkylpolyether diester, characterized in that the difference (Ta−T1) between the specific surface tension (Ta) of the adhesion promotion layer and the specific surface tension (T1) of the lubricant layer is adjusted to be a value ranging from 0.4 to 2 dyne/cm.

2. A magnetic recording medium according to claim 1 wherein the magnetic recording layer contains one member selected from the group consisting of ceramics and metal.

3. A magnetic recording medium according to claim 2 wherein the ceramics is selected from the group consisting of iron oxides and iron nitrides.

4. A magnetic recording medium according to claim 3 wherein the ceramics of iron oxide is selected from the group consisting of Fe$_3$O$_4$, γ-Fe$_2$O$_3$ and barium ferrite.

5. A magnetic recording medium according to claim 3 wherein the ceramics is composed of Fe$_3$N$_4$.

6. A magnetic recording medium according to claim 2 wherein the metal is selected from the group consisting of cobalt, iron and manganese.

7. A magnetic recording medium according to claim 6 wherein the magnetic recording layer is composed of at least one cobalt-containing metal selected from the group consisting of Co, Co-Ni-P, Co-Mn-P, Co-Mn-Ni-P, Co-Re, Co-Ni-Re, Co-Mn-Re-P, Co-Cr, Co-Fe-Cr, Co-V, Co-Ru, Co-Os, Co-Pt, Co-Ni-Pt, Co-Pt-Cr, Co-Pt-V, Co-Rh, Co-Cr-Rh, Co-Ni-Mo, Co-Ni-Cr, Co-Ni-W and Co-Sm.

8. A magnetic recording medium according to claim 6 wherein the magnetic recording layer is composed of at least one iron-containing metal selected from the group consisting of Fe-Mg, Fe-Nd, Fe-Ag, Fe-Pd and Fe-Tb.

9. A magnetic recording medium according to claim 6 wherein the magnetic recording layer is composed of at least one manganese-containing metal selected from the group consisting of Mn-Al and Mn-Cu-Al.

10. A magnetic recording medium according to claim 1, further comprising a protective layer between said magnetic recording layer and said adhesion promoting layer.

11. A magnetic recording medium according to claim 10 wherein the protective layer contains at least one member selected from the group consisting of ceramics, metal and plastic.

12. A magnetic recording medium according to claim 11 wherein ceramics selected is from the group consisting of silicon compound, metal oxide, metal nitride, metal sulfide, metal carbide, metal fluoride and semiconductor.

13. A magnetic recording medium according to claim 12 wherein silicon compound is selected from the group consisting of $SiO_2$, $SiN_4$, $SiC$ and silicate polymeric product.

14. A magnetic recording medium according to claim 12 wherein metal oxide is selected from the group consisting of $Al_2O_3$, $CoO$, $Co_3O_4$, $Co_2O_3$, $\gamma\text{-}Fe_2O_3$, $Cr_2O_3$, $CrO_3$, $TiO_2$, $ZrO_2$, $ZnO$, $PbO$, $NiO$, $MoO_2$ and $SnO_2$.

15. A magnetic recording medium according to claim 12 wherein metal nitride is selected from the group consisting of $TiN$, $ZrN$, $CrN$, $TaN$ and $BN$.

16. A magnetic recording medium according to claim 12 wherein metal sulfide is selected from the group consisting of $MoS_2$, $WS_2$ and $TaS_2$.

17. A magnetic recording medium according to claim 12 wherein metal carbide is selected from the group consisting of $TiC$, $ZrC$, $CrC$ and $TaC$.

18. A magnetic recording medium according to claim 12 wherein the protective layer is composed of graphite fluoride.

19. A magnetic recording medium according to claim 12 wherein the semiconductor is selected from the group consisting of Si, Ge, B, and C including amorphas carbon, diamondlike carbon or mixture thereof.

20. A magnetic recording medium according to claim 11 wherein the protective layer is composed of at least one metal selected from the group consisting of W, Cr, Ir, NiB, NiP, FeCr, NiCr, Sn, Pb, Zn, Tl, Au, Ag, Cu, Ga, Ru, Rh, Mn, Mo, Os, Ta and alloys thereof.

21. A magnetic recording medium according to claim 11 wherein the protective layer is composed of at least one plastic selected from the group consisting of polytetrafluoroethylene, phenol resin and polyimide.

22. A magnetic recording medium set forth in claim 1, characterized in that said adhesion promotion layer is composed of perfluoroalkylpolyethersilane represented by the formula:

$F[CF(CF_3)CF_2O]_nC_2F_4COONHC_2H_4Si(OCH_3)_3$ in which n is 10 to 20, and in that said lubricant layer is composed of perfluoroalkylpolyether represented by the formula:

$F[CF_3(CF_3)CF_2O]_mC_2F_5$ in which m is 30 to 40.

23. A magnetic recording medium set forth in claim 1, characterized in that said adhesion promotion layer is composed of perfluoroalkylpolyetherisocyanate represented by the formula:

$OCNC_6H_3(CH_3)HNOCF_2(C_2F_4O)_{12}(CF_2O)_8CF_2CONH(CH_3)C_6H_3NCO$ and in that said lubricant layer is composed of perfluoroalkylpolyether represented by the formula:

$F(C_2F_4O)_{16}(CF_2O)_{14}CF_3$.

24. A magnetic recording medium set forth in claim 1, characterized in that said adhesion promotion layer is composed of polyethyleneoxide trimethoxysilane represented by the formula:

$H_3C(C_2H_4O)_3Si(OCH_3)_3$ and in that said lubricant layer is composed of polyethyleneoxide represented by the formula:

$H_3C(C_2H_4O)_{10}H$.

25. A magnetic recording medium set forth in claim 1, characterized in that said adhesion promotion layer is composed of fluoroalkylthioethersilane represented by the formula:

$C_9F_{19}C_2H_4SSi(OCH_3)_3$ and in that said lubricant layer is composed of perfluoroalkane represented by the formula:

$C_{18}F_{38}$.

26. A magnetic recording medium set forth in claim 1, characterized in that said adhesion promotion layer is composed of perfluoroalkylpolyethersilane represented by the formula:

$(H_3CO)_3SiC_2F_6NHOCCF_2(C_2F_4O)_6(CF_2O)_4CF_2CONHC_3H_6Si(OCH_3)_3$ in which, and in that said lubricant layer is composed of perfluoroalkylpolyether represented by the formula:

$F(C_2F_4O)_{16}(CF_2O)_{14}CF_3$.

27. A magnetic recording medium set forth in claim 1, characterized in that said adhesion promotion layer is composed of perfluoroalkylpolyether dicarboxylic acid represented by the formula:

$HOOCCF_2(C_2F_4O)_8(CF_2O)_6CF_2COOH$ and in that said lubricant layer is composed of perfluoroalkylpolyether represented by the formula:

$F(C_2F_4O)_{18}(CF_2O)_{16}CF_3$.

28. A magnetic recording medium set forth in claim 1, characterized in that said adhesion promotion layer is composed of oxyperfluoroalkylpolyetheresilane represented by the formula:

$HOCH_2CF_2(C_2F_4O)_{14}(CF_2O)_{12}CF_2CH_2OCH_2CH(OH)C_3H_6Si(OCH_3)_3$ and in that said lubricant layer is composed of perfluoroalkylpolyetherdiol represented by the formula:

$HOCH_2CF_2(C_2F_4O)_{14}(CF_2O)_{12}CF_2CH_2OH$.

29. A magnetic recording medium set forth in claim 1, characterized in that said adhesion promotion layer is composed of perfluoroalkylpolyether diester represented by the formula:

$H_3COOCCF_2(C_2F_4O)_6(CF_2O)_4CF_2COONHC_2H_4Si(OC_2H_5)_3$ and in that said lubricant layer is composed of perfluoroalkylpolyether diester represented by the formula:

$H_3COOCCF_2(C_2F_4O)_{16}(CF_2O)_{14}CF_2COOCH_3$.

30. A magnetic recording medium comprising a substrate, a magnetic recording layer on the surface of said substrate, an adhesion promotion layer on said magnetic recording layer and a lubricant layer on said adhesion promotion layer, said adhesion promotion layer being at least one member taken from the group consisting of carboxyl; isocyanate; $-M(OR)_3-nR_n$, n being 0, 1 or 2 and M being Si, Ti, Zr, Ge or Sn; cyano; amino; $-NRH$, R being $-C_mH_{2m+1}$, and m being an integer more than 1; imino; ethyl; sulfonic; nitroso; hydroxyl; carboxylic ester; ureylene; amide; isothiocyanate; mercaptan; carbamoyl; phosphono; phosphinic; phosphoroso; phosphinetriyl; ether; sulfide; dimethyl peroxide; vinylene; and ethylene group; said lubricant layer being at least one member taken from the group consisting of perfluoroalkylpolyether, polytetrafluoroethylene, polytetrafluoroethylene tetramer, higher fatty acid, higher aliphatic alcohol, higher fatty ester, higher fatty amide, aliphatic amine, unsaturated higher fatty acid, long chain aliphatic hydrocarbon, iso-paraffin hydrocarbon oil, aromatic hydrocarbon, polyalkyleneglycol, dibasic acid ester, polyester, phosphate ester, polysiloxane, silicate ester, silane, polyoxiethylene, neopentylpolyol, polyphenylether, chlorofluorocarbon, fluoroester and 2,4,6-tripentalfuoroheptyltriazine, characterized in that the difference (Ta−T1) between the specific surface tension (T1) of the adhesion promotion layer and the specific surface tension (Ta) of the lubricant layer is adjusted to be a value ranging from 0.4 to 2 dyne/cm.

* * * * *